United States Patent [19]
Yamamoto

[11] Patent Number: 6,118,064
[45] Date of Patent: Sep. 12, 2000

[54] KARAOKE SYSTEM WITH CONSUMED CALORIE ANNOUNCING FUNCTION

[75] Inventor: Yoshikata Yamamoto, Kawasaki, Japan

[73] Assignee: Daiichi Kosho Co., Ltd., Tokyo, Japan

[21] Appl. No.: 09/390,548

[22] Filed: Sep. 3, 1999

[51] Int. Cl.[7] .............................. G09B 5/00; G10H 1/36
[52] U.S. Cl. ...................... 84/477 R; 84/610; 434/307 A
[58] Field of Search ................... 84/477 R, 478, 84/609–614, 633–638; 434/307 A

[56] References Cited

U.S. PATENT DOCUMENTS 5,208,413   5/1993   Tsumura et al. ...................... 84/610 X

*Primary Examiner*—Stanley J. Witkowski
*Attorney, Agent, or Firm*—Barnes & Thornburg

[57] ABSTRACT

A karaoke system acoustically outputting karaoke musical accompaniment together with a singing voice input from a microphone, and in the conjunction therewith, performing video output for image of lyric in synchronism with progress of karaoke musical accompaniment, is capable of announcing calorie consumption achieved by singing a song. The karaoke system includes sound volume integrating part for sampling singing voice input volume from the microphone at a given interval and sequentially integrating respective sampled values, converting part for converting an integrated value derived by the sound volume integrating means into a calorie consuming amount of a physical exercise by singing a song according to a predetermined algorithm, and announcing part for announcing the calorie consuming amount derived by the converting means to a user.

3 Claims, 2 Drawing Sheets

KARAOKE SYSTEM WITH CONSUMED CALORIE ANNOUNCING FUNCTION

BACKGROUND OF THE INVENTION

1. Field of the Invention

The present invention relates to a karaoke system for acoustically outputting a singing voice input through a microphone as mixed with a pre-recorded musical accompaniment.

2. Description of the Related Art

Man consumes calorie ingested from foods or the like by activity. If consumption of calorie by activity is insufficient in relation of the ingested calorie, extra calorie may be accumulated in a body as fat or the like to have adverse influence for health, and to result in fatness. For good balance between calorie ingestion and calorie consumption, it is necessary to perform enough activity.

Therefore, in the recent years, there is increased number of people who concern about calorific amount to be consumed by exercise of a body. For example, number of steps to walk in a day is checked by a pedometer fitted on the body to check calorific amount to be consumed by exercise of walking. By knowing calorific amount to be consumed by walking, ingestion of calorie is controlled corresponding to momentum, and in conjunction therewith, the ingested calorie is consumed on set purpose to lead in calorie management or diet.

In the meanwhile, in signing song on karaoke, substantial amount of calorie may be consumed corresponding to signing of song. Calorie consumption is caused by abdominal breathing in full-throated vocalization. A significant amount is consumed by intaking and discharging large amount of air into and from a lug by agitating diaphragm. An energy to be consumed herein is equivalent to momentum consumed by running for several tens meters. It has been said that by seriously signing a song, energy consumption can be equivalent to momentum of running for 100 meters.

However, conventionally, there is no way to know how much amount of calorie is consumed in signing a song. This is because attention has not be paid for calorie consuming effect in singing a song, and dieting effect and effect for health have been over-looked substantially completely. If one can know how much calorie is consumed in singing a song on karaoke, calorie consuming effect of karaoke can be recognized to make karaoke useful in calorie management or dieting.

SUMMARY OF THE INVENTION

It is therefore an object of the present invention to provide a karaoke system which can announce calorie consuming amount by a physical exercise upon singing a song in karaoke.

In order to accomplish the above-mentioned object, a karaoke system acoustically outputting karaoke musical accompaniment together with a singing voice input from a microphone, and in the conjunction therewith, performing video output for image of lyric in synchronism with progress of karaoke musical accompaniment, comprises:

sound volume integrating means for sampling singing voice input volume from the microphone at a given interval and sequentially integrating respective sampled values;

converting means for converting an integrated value derived by the sound volume integrating means into a calorie consuming amount of a physical exercise by singing a song according to a predetermined algorithm; and announcing means for announcing the calorie consuming amount derived by the converting means to a user.

In practice, the converting means may have a calorie consumption converting coefficient set for a karaoke data and conversion of the integrated value into the calorie consuming amount may be performed by multiplying the integrated value by the calorie consumption converting coefficient. The converting means may have a plurality of calorie consumption converting coefficients respectively set for respective karaoke data in a karaoke data base, and the calorie consuming amount may be derived on the basis of the integrated value of sung karaoke data and corresponding one of the calorie consumption converting coefficients.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

[Basic Construction and Operation of Karaoke System]

Figure 1:
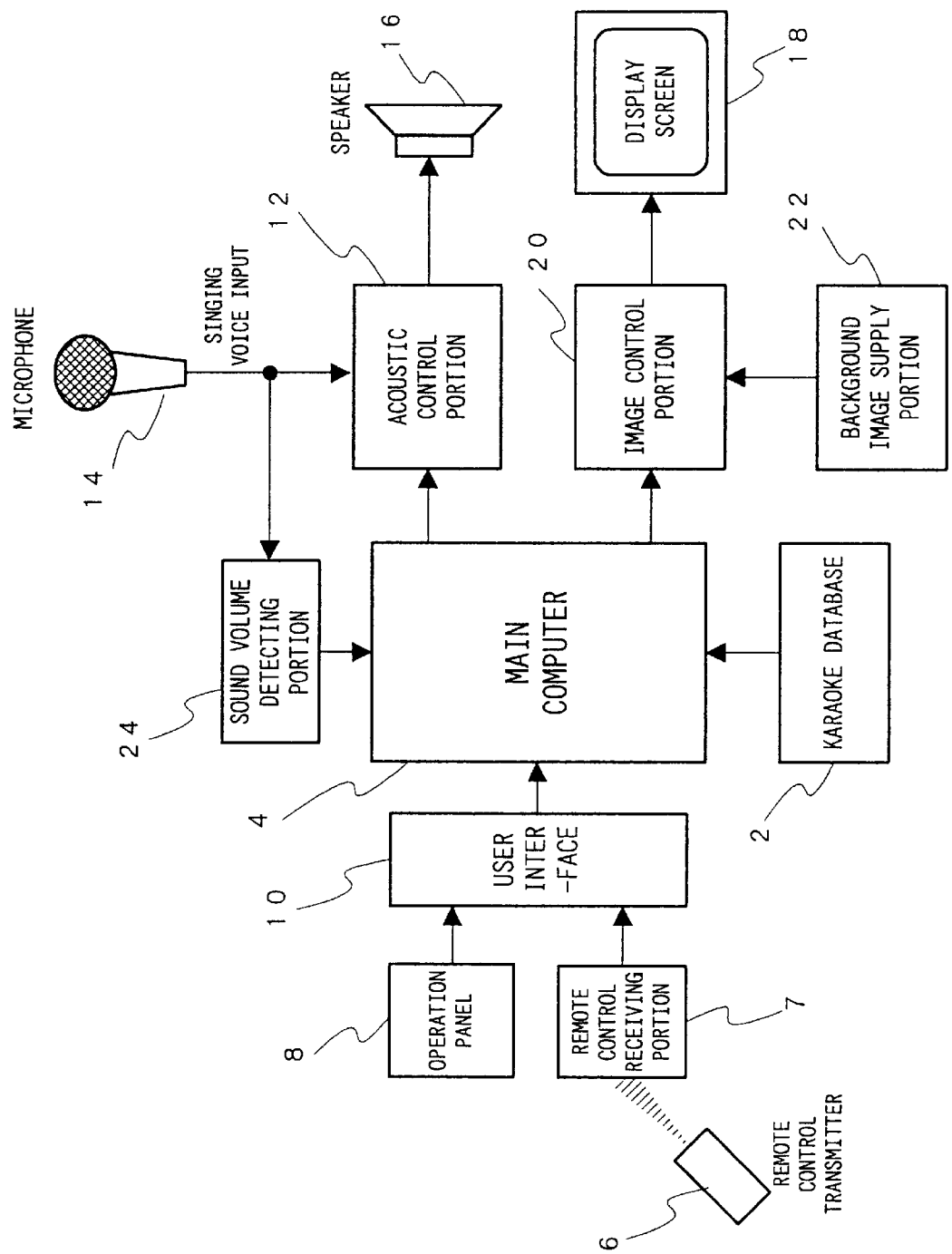
FIG. 1 is a block diagram showing a general construction of the preferred embodiment of a karaoke system according to the present invention.

FIG. 1 shows a construction of the preferred embodiment of a karaoke system according to the present invention. The shown karaoke system includes a karaoke database 2 storing a large number of karaoke data which is consisted of musical accompaniment data in MIDI (Musical Instrument Digital Interface) format or so on and a graphic display data for displaying lyric, graphical background image and so forth, a main computer 4 comprising a central processing unit (CPU) or the like. The main computer 4 sequentially reads out the karaoke data corresponding to a musical programs identified by requests input through a user interface 10 which comprises a remote control transmitter 6, an operation panel 8 and so forth for acoustically output the musical accompaniment corresponding to the requested musical program through a speaker 16 as mixed with a singing voice input through a microphone 14 via an acoustic control portion 12. On the other hand, in synchronism with acoustic output, lyric are graphically displayed on a display screen 18 via an image control portion 20. In the background of the lyric displayed on the display screen 18, other image or video image other than the lyric image may be appropriately displayed on the display screen 18.

[Sampling Process of Singing Voice Input Signal from Microphone]

Figure 2:
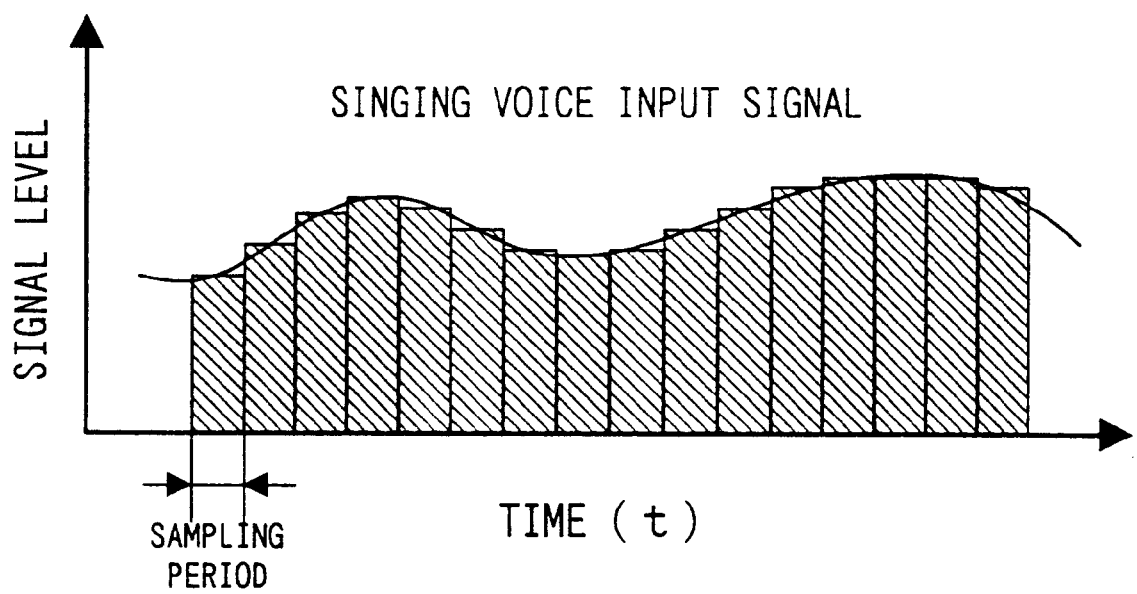
FIG. 2 is an explanatory illustration imaginarily showing sampling of singing voice input signal from a microphone in the preferred embodiment of the karaoke system of the present invention.

The shown embodiment of the karaoke system has a sound volume detecting portion 24 as means for announcing calorie consuming amount of a physical exercise in singing a song. The sound volume detecting portion 24 is constructed with various voice signal processing circuit, such as a voice signal processing A/D converter and so forth which can sample a voice signal, for example. To the sound volume detecting portion 24, a singing voice input signal is input from the microphone 14. The sound volume detecting portion 24 samples the singing voice input signal at a given time interval. In the sampling process, the sound volume detecting portion 24 performs process for sequentially taking out instantaneous value of signal level of the singing voice input signal at every predetermined period. The sampling interval is set about 0.2 seconds, for example. FIG. 2 imaginarily illustrate sampling of the singing voice input signal. These sample value is output to the main computer 4 from the sound volume detecting portion 24.

[Calculation of Calorie Consuming Amount by Main Computer]

The main computer 4 performs arithmetic process for sequentially integrating the sampled values fed from the sound volume detecting portion 24 during playing of karaoke data. By integrating the sampled value, a total amount of vocalized sound level of a singer integrated by time is derived over overall range of singing period.

Furthermore, the main computer 4 performs process for converting an integrated value derived by the arithmetic process into the calorie consuming amount of the physical exercise by singing of song. In the shown embodiment, arithmetic process to multiply a calorie conversion coefficient to the derived integrated value. Here, the calorie conversion coefficient represents a calorie consuming amount per unit vocalized sound amount, which may be derived experimentarily through actual measurement of calorie consuming amount for vocalizing sound amount when man having standard physical constitution sings a song normally. Concerning calorie consuming amount for the vocalized sound amount, calorie consuming amount is derived by measuring oxygen amount consumed by singing song by means of an oxygen consuming amount measuring device, as disclosed in Japanese Unexamined Patent Publication No. Heisei 5-212136. By this, the integrated value, namely calorie consuming amount on the basis of vocalized total sound amount of the singer, can be derived.

Accordingly, if the user sings a song with greater voice than normal volume, calorie consuming amount becomes greater. On the other hand, when the user sings a song at halfway and stop singing for the rest part of the song, the calorie consuming amount becomes half. On the other hand, if the user vocalize some voice during interlude of the song which is not the part to sing, the calorie consuming amount is increased in the corresponding amount.

The main computer 4 displays the derived calorie consuming amount on the display screen 18 for announcing the same to the user. The display of calorie consuming amount may be performed in real throughout a period where musical accompaniment of the selected musical program is in play. In the case where calorie consuming amount is displayed in real time during playing karaoke, a message, such as "Currently, your consumed calorie amount is ○○○ kcal.", or, in the alternative, a gauge design recognizable at a glance may be used to be easily seen by the user. On the other hand, when calorie consuming amount is displayed on the display screen 18 after playing of karaoke, standard calorie consuming amount, an average value or so forth may also be displayed together with a message, such as "Calorie amount you have consumed in this song is ○○○ kcal." In addition, the main computer 4 may output the derived calorie consuming amount in other way by means of various output devices. For example, the derived calorie consuming amount is displayed by way of printing on a paper by a printer or the like.

Upon transition to playing process of a next musical program after finishing of playing process of the karaoke data, the main computer 4 initializes the integrated value and thereafter starts arithmetic process for deriving the calorie consuming amount of the next musical program. In such manner, calorie consuming amount is derived per each play of karaoke.

[Other Embodiment]

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For example, (1) integrating process of the sample value, converting of the result of integration into the calorie consuming amount of physical exercise, and announcing the result of conversion to the user may be performed by the sound volume detecting portion or other component instead of the main computer 4.

(2) Conversion of the integrated value into the calorie consuming amount may be performed by other algorithm other than that using the calorie conversion coefficient set on the basis of oxygen consuming amount set forth above.

(3) It may be preferably to rough calorie consuming amount in the case when man having standard physical constitution sings the song, is preliminarily indicated on an index book, such as an electronic index book or so forth. In this case, the user may see the index book to know musical programs which have large calorie consuming amounts or conversely have small calorie consuming amounts. Thus, the user may sing songs selecting musical programs having high diet effect.

As set forth above, in the karaoke system, since the calorie consuming amount by vocalizing activity upon singing song can be announced to the user on the basis of singing voice input from the microphone, it becomes possible to notice calorie consuming effect by playing karaoke for widely spreading karaoke for application of good for health. Thus, karaoke can be effectively used for dieting and/or calorie management.

Furthermore, the user may see own vocalizing volume on the basis of the announced calorie consuming amount, the user can make judgment whether he or she sung the song in correct breath and correct volume or not and thus whether he or she sung the song correctly. Therefore, means for announcing the calorie consuming amount can be used as means for providing guidance for correct vocalism.

What is claimed is:

1. A karaoke system acoustically outputting karaoke musical accompaniment together with a singing voice input from a microphone, and in the conjunction therewith, performing video output for image of lyric in synchronism with progress of karaoke musical accompaniment, comprising:

sound volume integrating means for sampling singing voice input volume from said microphone at a given interval and sequentially integrating respective sampled values;

converting means for converting an integrated value derived by said sound volume integrating means into a calorie consuming amount of a physical exercise by singing a song according to a predetermined algorithm; and announcing means for announcing said calorie consuming amount derived by said converting means to a user.

2. A karaoke system as set forth in claim 1, wherein said converting means has a calorie consumption converting coefficient set for a karaoke data and conversion of said integrated value into said calorie consuming amount is performed by multiplying said integrated value by said calorie consumption converting coefficient.

3. A karaoke system as set forth in claim 2, wherein said converting means has a plurality of calorie consumption converting coefficients respectively set for respective karaoke data in a karaoke data base, and said calorie consuming amount is derived on the basis of said integrated value of sung karaoke data and corresponding one of said calorie consumption converting coefficients.

* * * * *